US010006603B2

(12) United States Patent
De Kievit et al.

(10) Patent No.: US 10,006,603 B2
(45) Date of Patent: Jun. 26, 2018

(54) LIGHT REFLECTOR ARRANGEMENT

(71) Applicant: SMR PATENTS SARL

(72) Inventors: Gary De Kievit, South Australia (AU); Simon Timothy Belcher, South Australia (AU)

(73) Assignee: SMR Patents S.á.r.l., Luxembourg (LU)

( * ) Notice: Subject to any disclaimer, the term of this patent is extended or adjusted under 35 U.S.C. 154(b) by 93 days.

(21) Appl. No.: 14/792,990

(22) Filed: Jul. 7, 2015

(65) Prior Publication Data
US 2015/0308650 A1   Oct. 29, 2015

Related U.S. Application Data

(63) Continuation of application No. PCT/EP2013/077814, filed on Dec. 20, 2013.

(30) Foreign Application Priority Data

Jan. 7, 2013  (AU) ................................ 2013900051

(51) Int. Cl.
*F21V 7/00*     (2006.01)
*F21S 8/10*     (2006.01)
(Continued)

(52) U.S. Cl.
CPC .......... *F21S 48/234* (2013.01); *B60Q 1/2665* (2013.01); *B60R 1/1207* (2013.01);
(Continued)

(58) Field of Classification Search
CPC ........ F21S 48/234; F21S 48/215; F21S 48/24; B60Q 1/2665; B60R 1/1207; F21Y 2101/00
(Continued)

(56) References Cited

U.S. PATENT DOCUMENTS

2003/0007362 A1*  1/2003  Robison .............. B60Q 1/2665
                                               362/487
2008/0273345 A1* 11/2008  Yajima ................ B60Q 1/2665
                                               362/517
(Continued)

FOREIGN PATENT DOCUMENTS

DE          200 13 330 U1     2/2000
DE     10 2012 007 228 A2     7/2012
(Continued)

OTHER PUBLICATIONS

International Search Report and the Written Opinion dated Mar. 20, 2014.

*Primary Examiner* — Bao Q Truong
*Assistant Examiner* — Glenn Zimmerman
(74) *Attorney, Agent, or Firm* — Jones Day

(57) ABSTRACT

A light reflector arrangement providing a light output having substantially uniform luminous intensity is disclosed. The light reflector arrangement includes at least one light emitting diode (LED) light source. For each light source, the light reflector arrangement includes a first reflector configured to receive light from the light source and reflect said light towards a second reflector such that light reflected from the second reflector has substantially uniform luminance observable from a single direction. For example, the second reflector has light scattering means for removing directionality of light reflected from the second reflector. The light reflector arrangement may further include a lens configured to receive the light reflected from the second reflector. The lens preferably has a light diffusing surface such that light output through the lens has a substantially uniform luminance observable from more than one direction.

15 Claims, 6 Drawing Sheets

(51) Int. Cl.
*B60Q 1/26* (2006.01)
*B60R 1/12* (2006.01)
*F21S 43/14* (2018.01)
*F21S 43/31* (2018.01)
*F21S 43/40* (2018.01)
*F21Y 115/10* (2016.01)

(52) U.S. Cl.
CPC ............... *F21S 43/14* (2018.01); *F21S 43/31* (2018.01); *F21S 43/40* (2018.01); *F21Y 2115/10* (2016.08)

(58) Field of Classification Search
USPC .................. 362/516, 459, 498, 517, 518
See application file for complete search history.

(56) References Cited

U.S. PATENT DOCUMENTS

| | | | |
|---|---|---|---|
| 2010/0008088 A1* | 1/2010 | Koizumi | B60Q 1/0058 362/235 |
| 2010/0149803 A1* | 6/2010 | Nakano | F21S 43/14 362/235 |
| 2010/0172152 A1* | 7/2010 | Boonekamp | F21V 7/0008 362/609 |
| 2010/0290243 A1* | 11/2010 | Janssen | B60Q 1/0041 362/551 |
| 2010/0296303 A1* | 11/2010 | Sarioglu | E05B 17/10 362/487 |
| 2011/0038139 A1* | 2/2011 | Chung | B29C 55/143 362/97.1 |
| 2011/0084608 A1* | 4/2011 | Lin | B60Q 3/025 315/77 |
| 2012/0051063 A1* | 3/2012 | Holder | F21V 5/008 362/299 |
| 2014/0192285 A1* | 7/2014 | Shinkai | H04N 13/0402 349/15 |

FOREIGN PATENT DOCUMENTS

| | | |
|---|---|---|
| EP | 1 126 209 A2 | 8/2001 |
| EP | 0758070 B1 | 9/2002 |
| EP | 1 886 871 A1 | 7/2007 |
| EP | 2 524 841 A2 | 11/2012 |
| FR | 2 736 705 A1 | 12/1995 |
| JP | 2004 210236 A | 7/2004 |

* cited by examiner

LIGHT REFLECTOR ARRANGEMENT

CROSS-REFERENCE TO RELATED APPLICATIONS

This application is a continuation of International Patent Application No. PCT/EP2013/077814, filed on Dec. 30, 2013, which claims the benefit of Australian Patent Application No. AU 2013900051, filed on Jan. 7, 2013, the entire disclosure of which are both incorporated herein by reference for all purposes in their entirety.

TECHNICAL FIELD

The present invention relates to light reflector arrangements. In a particular form the present invention relates to a light reflector arrangement for use in a lamp for an automotive vehicle, although the invention is not limited to this application.

BACKGROUND

Light emitting diodes (LEDs) are used as light sources in many automotive lamp applications. LEDs are fast replacing traditional incandescent light bulbs since they are more energy efficient, have a longer service life and permit shallower packaging compared to most bulb-type assemblies.

Unlike an incandescent filament, an LED is an inherently directional light source meaning that the relative luminous intensity of an LED varies with viewing angle (or direction). The luminous intensity is highest at 0° (normal viewing angle) and drops off significantly as the viewing angle approaches 90°. The effect of this directionality is that an LED appears brightest when viewed directly and becomes dimmer as the viewing angle increases. LEDs used in automotive lamp applications have the drawback that when active, the LEDs appear as a series of discrete "bright" or "hot" spots. The lamp will also be quite directional such that when viewed from an acute angle, the lamp will appear dimmer.

From an aesthetic viewpoint, for an automotive lamp having a series of LED light sources, it would be advantageous to provide a light output of substantially uniform luminance across the viewing surface of the lamp when viewed from more than one direction.

In the past, directional light from LEDs has been diffused by an optical diffuser. An optical diffuser is typically some kind of translucent object that scatters light in all directions. Most diffusers however are inefficient as some light is lost to reflection and not all light passes through the diffuser. This solution, while assisting to spread the directional light to create a uniform appearance, suffers from optical inefficiencies caused by the diffusing medium. In the automotive lighting industry, optical efficiency is an important design driver as manufacturers seek to reduce cost and package size of the lamp.

An object of the present invention is to ameliorate one or more of the above described difficulties or at least provide a useful alternative to arrangements of the type discussed above.

Other advantages of the present invention will become apparent from the following description, taken in connection with the accompanying drawings, wherein, by way of illustration and example, a preferred embodiment of the present invention is disclosed.

SUMMARY

According to a first aspect, there is provided a light reflector arrangement, including:

at least one light emitting diode (LED) light source; for each light source, the light reflector arrangement including:

a first reflector configured to receive light from the light source and reflect said light towards a second reflector such that light reflected from the second reflector has substantially uniform luminance observable from a single direction.

In one form, the first reflector has a non-spherical curvature.

In one form, substantially all light emitted from the light source is incident upon the first reflector.

In one form, the second reflector includes light scattering means consisting of either a rough surface, pillow optics or a wave form comprising a plurality of trough-shaped reflectors.

In one form, the light reflector arrangement further includes a lens configured to receive the light reflected from the second reflector, the lens providing a viewing surface for the light reflector arrangement.

It is preferred that the light emitting diode (LED) light source emits light in a direction averted to the lens.

In one form, the lens has a light diffusing surface opposite the viewing surface such that light output through the lens has a substantially uniform luminance observable from more than one direction. The light diffusing surface of the lens may be formed by applying a surface roughness of greater than 0.4 microns.

In one form, the lens is tinted so as to only allow light transmission of between 30-75%. The tint may be black or any other suitable colour to achieve the desired light transmission.

In one form, the first reflector and the second reflector are integrally moulded.

According to a second aspect, there is provided a lamp assembly for an automotive vehicle, including:

at least one light emitting diode (LED) light source; for each light source, the lamp assembly further including:

a first reflector configured to receive light from the light source;

a second reflector configured to receive reflected light from the first reflector; the second reflector having light scattering means for removing directionality of light reflected from the second reflector; and a lens configured for receiving light reflected from the second reflector, the lens having a viewing surface and a light diffusing surface opposite the viewing surface;

wherein, light output through the lens has a substantially uniform luminance observable from more than one direction.

In one form, the lamp assembly is a turn signal lamp housed in an exterior rear view mirror of the vehicle. Alternatively, the lamp assembly may be used for a rear tail light, rear brake light, or front position light.

According to a third aspect, there is provided a lamp assembly for an automotive vehicle, including:

at least one light emitting diode (LED) light source; for each light source, the lamp assembly further including:

a first reflector configured to receive light from the light source;

a second reflector configured to receive reflected light from the first reflector; the second reflector having a waveform comprising a plurality of trough-shaped reflectors for removing directionality of light reflected from the second reflector; and a tinted lens allowing light transmission of between 30-75% configured for receiving light reflected from the second reflector, the lens having a viewing surface and a light diffusing surface opposite the viewing surface;

wherein, light output through the lens has a substantially uniform luminance observable from more than one direction.

The invention, thus, provides a light reflector arrangement with a unique optical pathway for light output of a LED light source to a lens with multiple reflections avoiding any direct light from the LED light source straight to the lens which in turn ensure that the LED light source is not visible through the lens. The entire light output appears as one lamp as a substantially uniform luminance is observable from a single direction.

BRIEF DESCRIPTION OF DRAWINGS

Embodiments of the present invention will be discussed with reference to the accompanying drawings wherein:

FIG. 4b is a cross-sectional view of a segment of the light reflector arrangement taken through the plane of the light rays shown in FIG. 4a;

DESCRIPTION OF EMBODIMENTS

The present disclosure relates to a light reflector arrangement able to provide a light output from an LED source input having substantially uniform luminous intensity. For the purposes of this description, it is assumed that when a lit surface is viewed from a distance of 1 m, a variation of luminous intensity of 2:1 is perceived by the human eye to be 'substantially uniform' or 'homogenous'. The light reflector arrangement described herein has particular usefulness in the automotive lighting industry where it may be used in vehicle lamps such as turn signal lamps, rear tail lamps, rear brake lamps, front position lamps etc.

Figure 1:
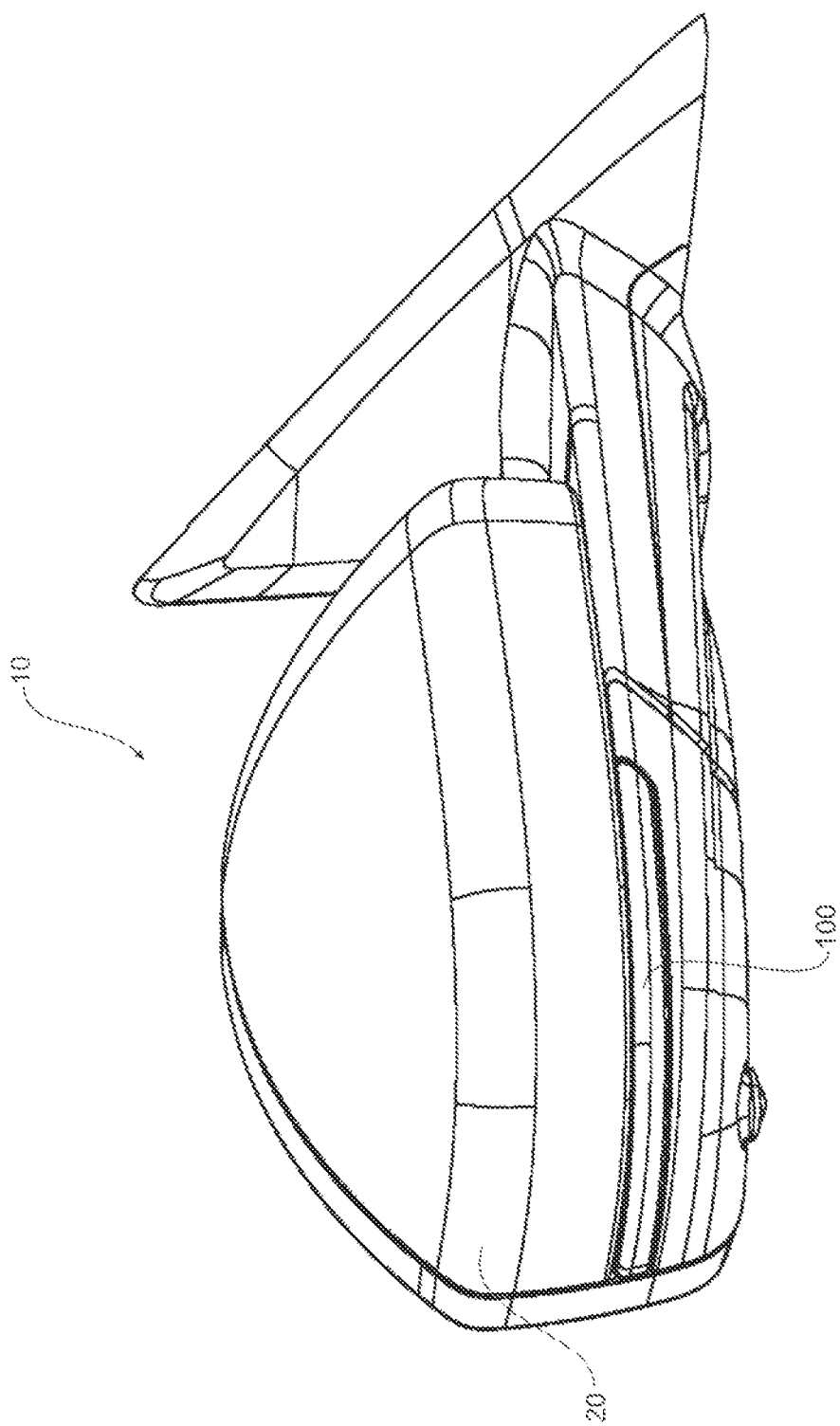
FIG. 1 is a perspective view of a turn signal lamp housed in an external rear view mirror of a vehicle.

Referring now to FIG. 1, there is shown a preferred example of a vehicle lamp in which the light reflector arrangement of the present disclosure may be used. FIG. 1 provides a perspective view of a vehicle turn signal lamp 100 housed in an external rear view mirror 10 of a vehicle. The external rear view mirror 10 includes a casing 20 which houses a mirror (not shown) and a turn signal lamp 100. The turn signal lamp 100 is integrated into the rear of the mirror casing 20. The observable portion of the turn signal lamp 100 is lens 110 (shown more clearly in FIGS. 3-4b). The lens 110 may extend slightly outward from the mirror casing 20 and will generally have an elongate profile shaped to conform to the outer contour of the mirror casing 20.

Figure 2:
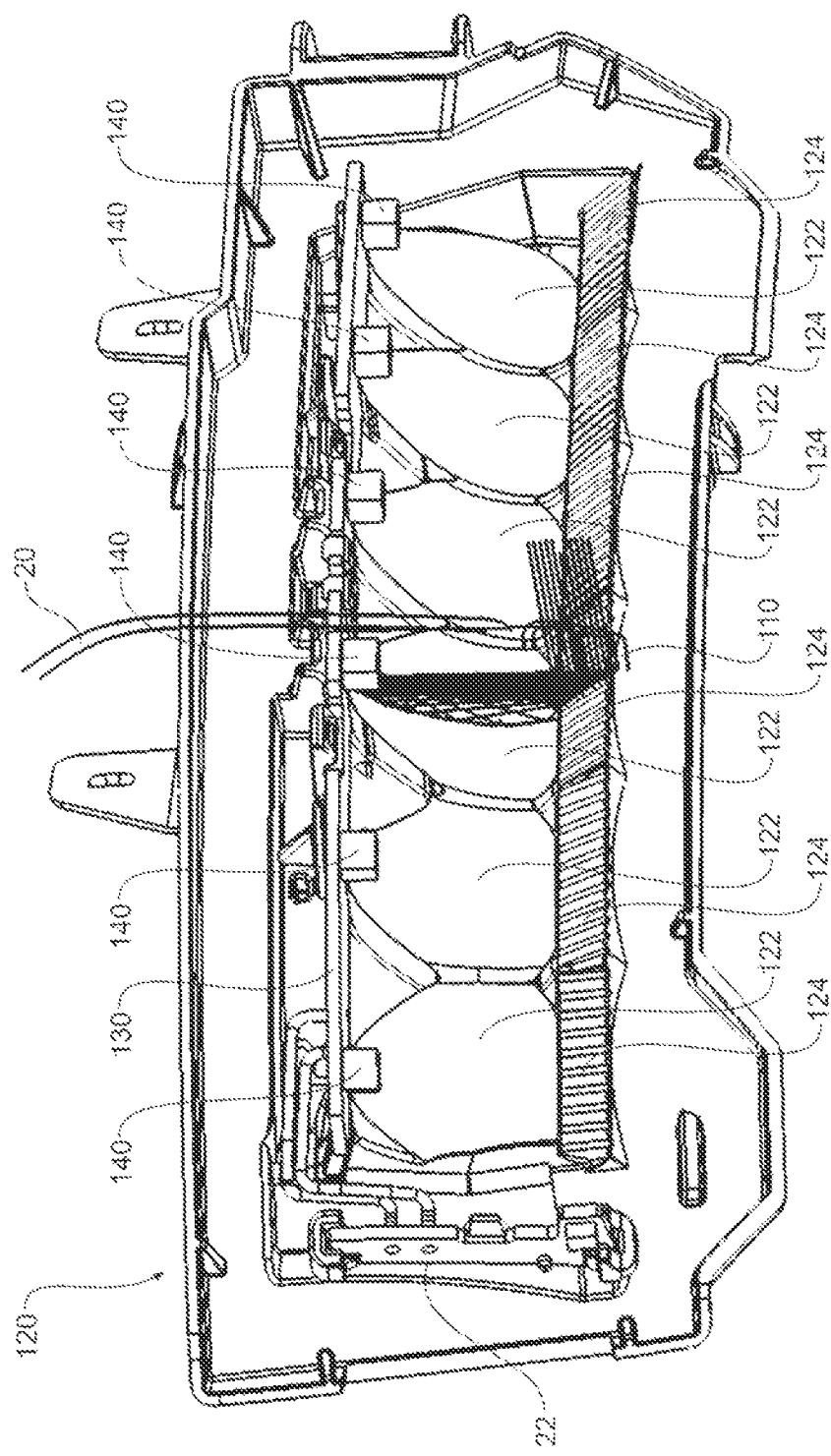
FIG. 2 is a perspective view of a light reflector arrangement according to an embodiment of the invention.

Referring now to FIG. 2, there is shown a perspective view of a light reflector arrangement 120 according to an embodiment of the invention that may be used in the turn signal lamp 100 of FIG. 1. The light reflector arrangement 120 includes a plurality of LED light sources 140 mounted to a printed circuit board (PCB) 130. Each light source 140 is associated with a first reflector 122 and a second reflector 124. The respective first and second reflectors 122, 124 associated with each light source 140 are integrally moulded and arranged adjacent one another in lamp housing 22. In the arrangement shown in FIG. 2, there are six first and second reflectors 122, 124 associated with six LED light sources 140. More or less light sources and reflectors may be used depending on the application, packaging restraints and efficiency requirements of the system. Overlayed onto FIG. 2 is a section of the mirror casing 20 and lens 110. Also shown schematically are light rays in a single plane emitted from one of the light sources 140 that is output through the lens 110. As shown, the light sources 140 are mounted above the viewable portion of the lens 110 behind part of the mirror casing 20 such that the light sources 140 are not directly viewable through the lens 110.

The reflectors 122, 124 may be manufactured from a polycarbonate (PC) or other suitable substrate material. The reflectors 122, 124 are coated using a vacuum metallization process which provides them with a reflectivity of approximately 80%. Alternatively, the reflectors could be manufactured from a naturally reflective substrate such as white PC. The lens 110 may be manufactured from an acrylic (PMMA) or other suitable transparent or semi-transparent substrate, and would typically be 1-3 mm thick.

Figure 3:
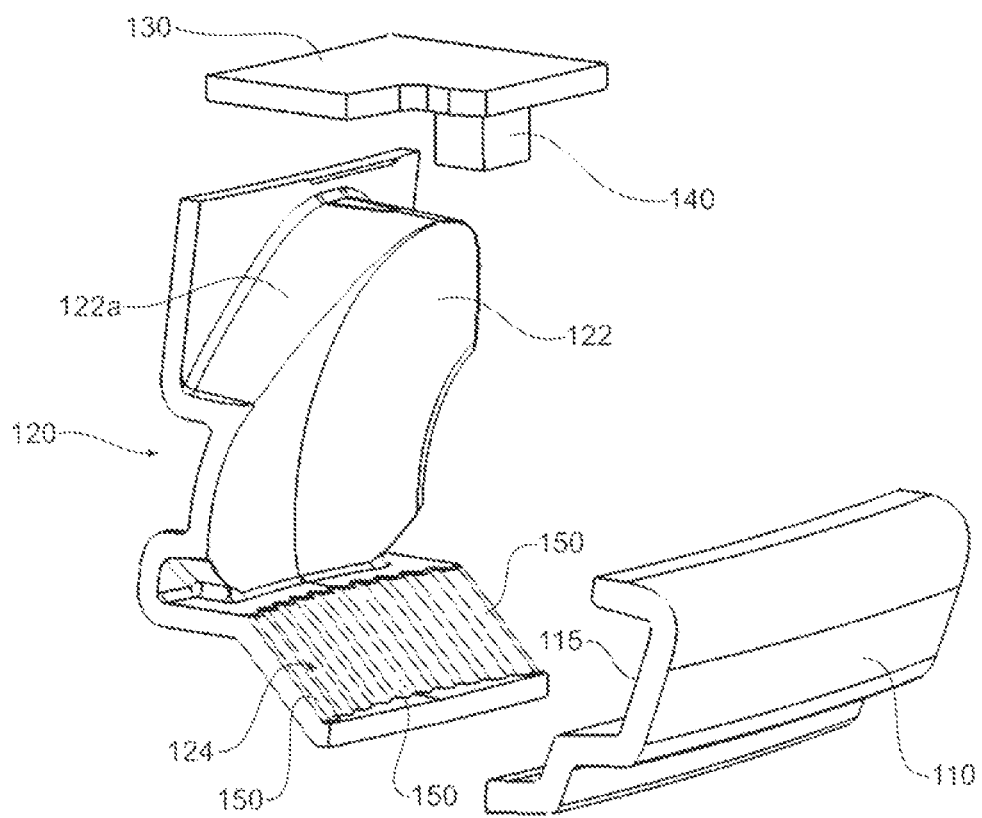
FIG. 3 is an exploded perspective view of a section of the light reflector arrangement of FIG. 2.
Figure 4A:
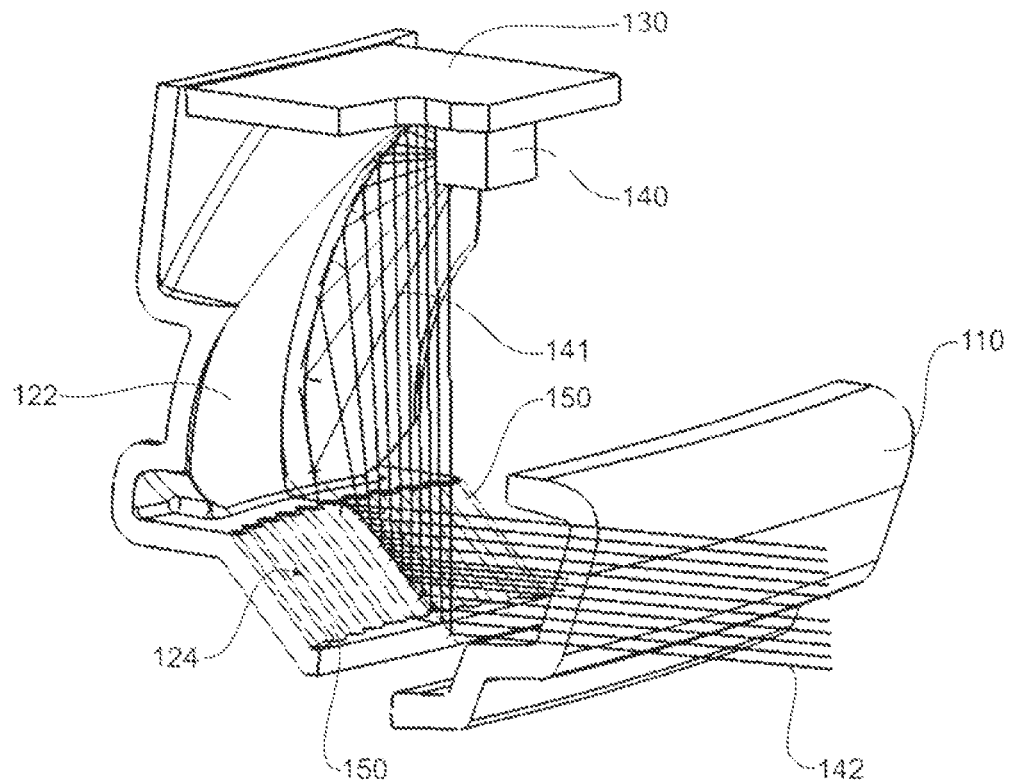
FIG. 4a is a perspective view of a segment of the light reflector arrangement of FIG. 2 showing the path of light rays in a single plane from the light source to the lens.
Figure 4B:
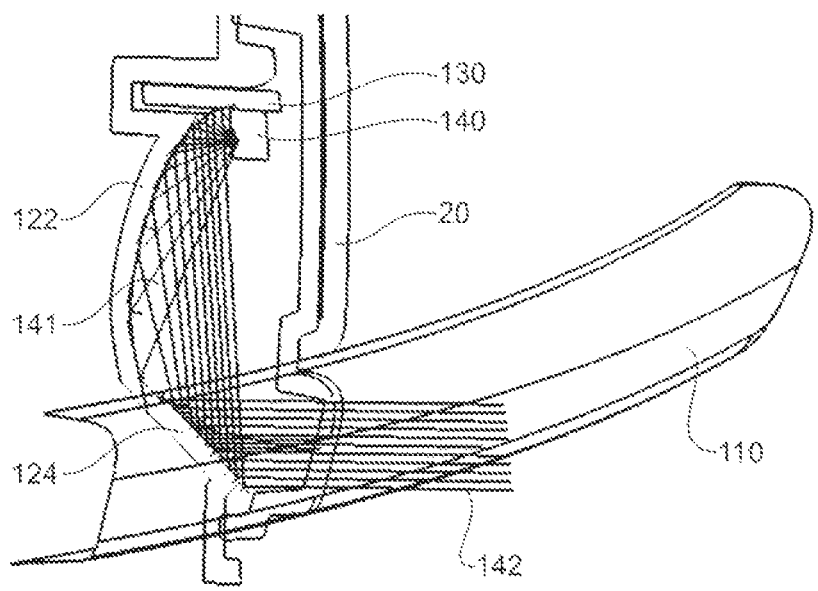

The light reflector arrangement 120 shall now be described in further detail with reference to FIGS. 3, 4a and 4b. FIG. 3 shows an exploded view of a segment of the light reflector arrangement 120, light source 140, PCB 130 and segment of the lens 110. FIGS. 4a and 4b show views of the segment of the light reflector arrangement 120 showing the path of light rays 141, 142 in a single plane from the light source 140 to the lens 110. In operation, light emitted from the light source 140 is directly incident upon the first reflector 122 and not upon the lens 110, rather averted to the lens 110. The first reflector 122 is positioned such that substantially all light emitted from the light source is incident upon and captured by the first reflector 122. The first reflector 122 may further have a hood 122a which helps to minimise any leakage of light from the light source 140. As light from the light source 140 is not incident directly upon the second reflector 124, efficiency of the arrangement is enhanced. The first reflector 122 has a complex curvature which is generally non-spherical having more than one radius of curvature. The second reflector 124 receives light reflected from the first reflector 122. The second reflector 124 is generally concave and may have a single radius of curvature. In FIGS. 3, 4a and 4b, a preferred embodiment of the second reflector 124 is shown where the surface of the second reflector 124 includes light scattering means 150 in the form of a plurality of scoop or trough portions that scatter light incident upon the second reflector 124 to reach the lens 110 as will be described further.

The first reflector 122 is configured (i.e. by position and curvature) such that light output from the surface of the second reflector 124 has a substantially uniform luminance observable from a single direction. The uniform light output from the surface of the second reflector 124 is achieved through optic design. Light from the light source 140 is mapped in power bands of varying light intensity between the first reflector 122 and second reflector 124. Light in a higher power band is incident upon a larger surface area of the first reflector 122 than light in a lower power band. In this way, light of higher intensity is spread across a greater surface area. The first reflector 122 is shaped such that light reflected from each surface area of the first reflector 122 is incident upon an equal surface area of the second reflector 124 with substantially the same power level. Through this power band mapping, a uniform light output from the second reflector 124 is able to be achieved. The precise shape of each reflector is developed by following the above process, and will change as geometric constraints change.

The second reflector 124 is configured to reflect light through lens 110. In this way, substantially all light reflected from the surface of the second reflector 124 is directed towards the lens 110 to maximise efficiency and minimise any leakage of light out of the system. The first and second reflectors 122, 124 therefore function to transform a directional LED light source 140 into a uniform or homogenous light output at the lens 110. Light reflected from the second reflector 124 is directed through lens 110 and is directly viewable by an observer. When the lens 110 is viewed normal to its surface, a homogenous band of light is viewable having substantially uniform luminous intensity. The reflector arrangement 120 of the present invention therefore removes "hot spots" normally associated with LED light sources used in prior art vehicle lamps with good optical efficiency. The reflector arrangement 120 is placed within the light path from the LED light source 140 to the lens 110 and allows to arrange the LED light source 140 averted to the lens 110. Thus, instead of a direct lens solution an indirect solution is offered which ensures that the LED light source 140 cannot be viewed through the lens 110.

Figure 5A:
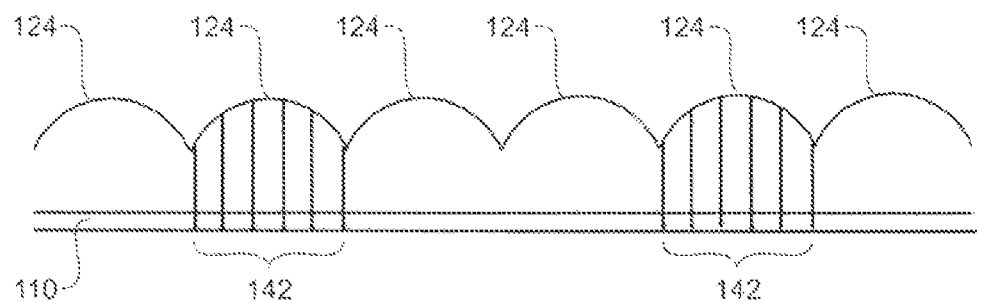
FIG. 5a is a figurative view illustrating light output from two arbitrary second reflectors of the light reflector arrangement.
Figure 5B:
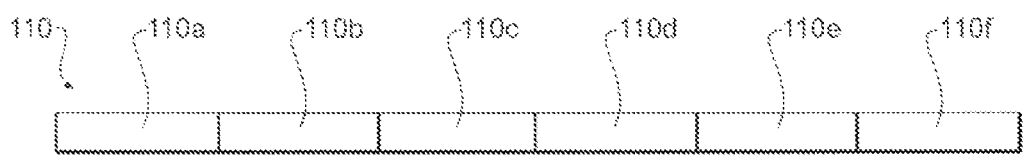
FIG. 5b is a figurative view of the lens of FIG. 5a showing discrete segments of substantially uniform luminance observable from a single direction.

The above described light reflector arrangement 120 represents an embodiment of the present invention in one form. It has been found that when the second reflector 124 has a plain surface (with no light scattering means), the light output, whilst uniform, is still directional in that the output only has a substantially uniform luminance observable from a single direction (i.e. when a segment of the lens is viewed normal to its surface). This is shown schematically in FIGS. 5a and 5b. FIG. 5a depicts light rays 142 reflected from the surface of two of the second reflectors 124 (chosen arbitrarily for purposes of illustration) and transmitted through the lens 110. If the lens 110 were viewed normal to its surface at segment 110b or 110e, each segment would have a substantially uniform luminance. However, if either segment 110b or 110e is viewed at an angle to its surface then the luminance would not be uniform. Furthermore, for this arrangement, light output from adjacent second reflectors 124 do not blend together. For example, light output through lens segment 110c would not be visible if the lens 110 was viewed normal to segment 110b.

Figure 6A:
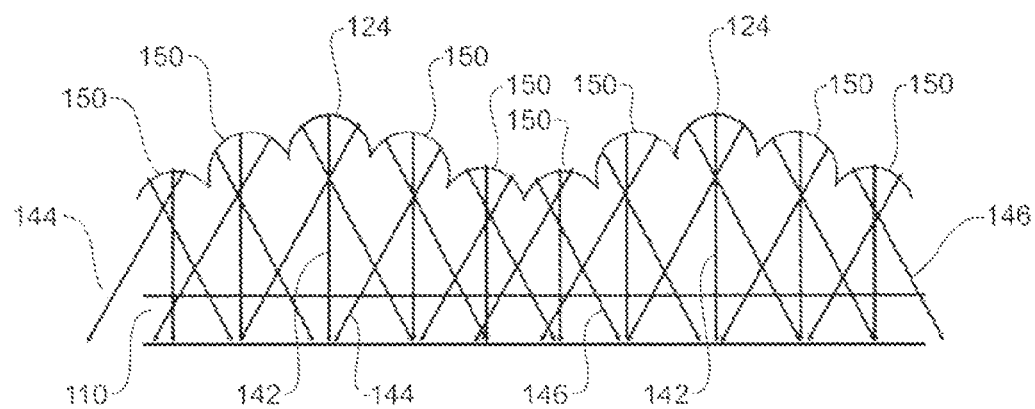
FIG. 6a is a figurative view illustrating light output from adjacent second reflectors of the light reflector arrangement where each second reflector has a wave form.

The applicant has found that the invention may be enhanced by providing light scattering means 150 on the surface of the second reflector 124 such that light output through the plurality of lens segments 110a-110f is blended together to provide an output that has a substantially uniform luminance observable from more than one direction. The light scattering means 150 may take the form of any suitable optic feature including a rough surface, pillow optics or a wave form as depicted in FIG. 6a. The wave form 150 comprises a plurality of scoops or trough portions that function to spread the light output from the second reflector 124 substantially horizontally. Light rays being spread horizontally are depicted in FIG. 6a as light rays 144 and 146. In this way, light is spread such that the light output through adjacent lens segments is blended together.

Figure 6B:
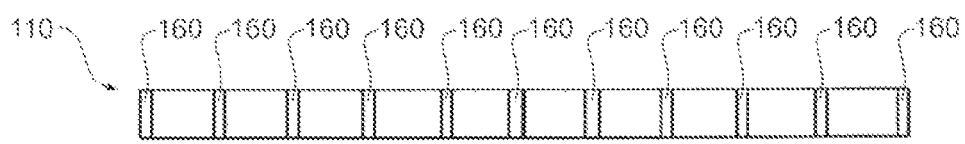
FIG. 6b is a figurative view of the lens of FIG. 6a showing an output of substantially uniform luminance observable from more than one direction but having stripes in the output.

For a second reflector 124 having a wave form 150 as shown in FIG. 6a, the appearance of the light output through the lens 110, while being substantially uniform from more than one direction, has been found to have discrete stripes 160 as shown in FIG. 6b. The stripes 160 form due to the discontinuity between the scoops or troughs of each second reflector 124. Controlling the pitch and the tangent angles of the scoops and/or pillows, reduces the visibility of the above discrete stripes, but the appearance of stripes 160 in the output is not desirable and so the invention may be further enhanced by providing a solution to this problem.

Figure 7A:
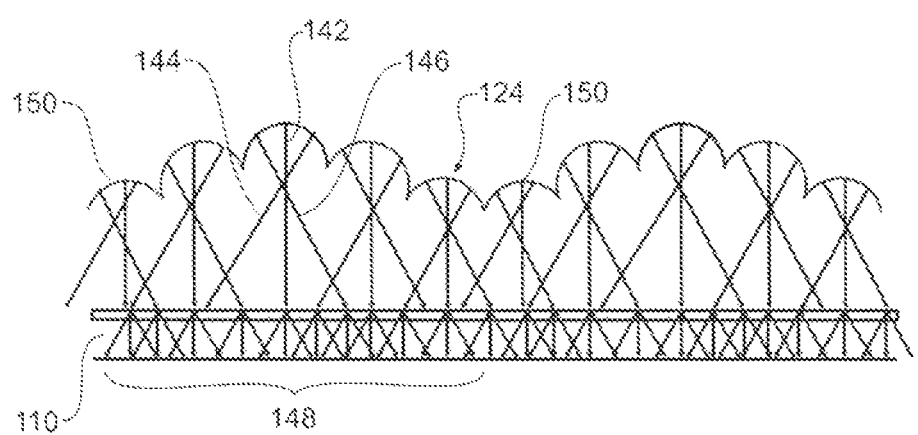
FIG. 7a is a figurative view illustrating light output from adjacent second reflectors of the light reflector arrangement where each second reflector has a wave form and the lens further includes a light diffusing surface.
Figure 7B:
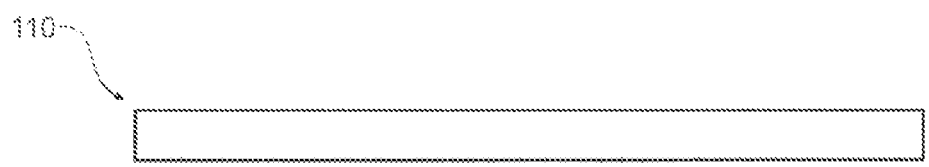
FIG. 7b is a figurative view of the lens of FIG. 7a showing an output of substantially uniform luminance observable from more than one direction.

It has been found that by additionally providing a light diffusing surface 115 on the lens 110, the stripes 160 are removed from the output as schematically represented in FIG. 7b. In a preferred form as shown figuratively in FIG. 7a, the light diffusing surface 115 is a rear surface of the lens 110 that is opposite the front viewable surface of the lens 110. The light diffusing surface 115 may be formed by surface finishing the lens 110 with a tool so as to provide a surface roughness of greater than 0.4 microns. The light diffusing surface 115 diffuses light rays 148 in all directions so that when the lens 110 is viewed from multiple directions, a substantially uniform luminance will be observed. In addition to blending together the stripes 160 created by the wave form 150, a further advantage of the diffusing lens surface 115 is that it helps to hide internal detail behind the lens 110.

Another advantage of the present invention resides in its optical efficiency over the prior art. For example, due to optical inefficiency of using an optical diffuser, to achieve the same level of luminance that is output through the lens of the present invention, a much larger number of LEDs would previously have been required. Through efficient optical design, the number of LEDs required to achieve a given optical luminance output is minimised by the light reflector arrangement of the present invention. This in turn minimises manufacturing costs whilst still achieving optical performance requirements.

In one form, the lens 110 of the light reflector arrangement 120 is tinted so as to only allow light transmission of between 20-75%. The tint may be dark (i.e. black) or any other suitable colour to achieve the above light transmission. The effect of this tinting is that when the light sources are OFF the lens 110 simply appears dark and no internal optics of the reflector arrangement are observable by an external viewer. The light diffusing surface of the lens may further enhance this effect. However, when the light sources are activated, the lens 110 glows evenly with substantially uniform luminance from one or more directions. When a turn signal lamp having a tinted lens is integrated into the housing of an external rear view mirror of a vehicle, if the housing is also black then the turn signal lamp will blend in with the surrounding casing and it may not be immediately apparent that a turn signal lamp is even there.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A light reflector arrangement, including:
at least one light emitting diode (LED) light source; for each light source, the light reflector arrangement including:
a first reflector configured to receive light from the light source and reflect said light towards a second reflector such that light reflected from the second reflector has substantially uniform luminance observable from a single direction; and
a lens configured to receive the light reflected from the second reflector, the lens providing a viewing surface for the light reflector arrangement,
wherein the lens is tinted so as to only allow light transmission of between 30-75%, and
wherein the second reflector includes a plurality of concave surfaces, wherein in a cross-section, the concave surfaces each have a single radius forming a plurality of curved troughs, adjacent curved troughs directly contacting one another, and
wherein the light reflector arrangement is configured to be used for at least one of a vehicle lamp and a vehicle turn signal lamp.

2. The light reflector arrangement of claim 1 wherein the first reflector has a non-spherical curvature.

3. The light reflector arrangement of claim 1 wherein substantially all light emitted from the light source is incident upon the first reflector.

4. The light reflector arrangement of claim 1 wherein the light emitting diode (LED) light source emits light in a direction averted to the lens.

5. The light reflector arrangement of claim 1 wherein the first reflector and the second reflector are integrally moulded.

6. A lamp assembly for an automotive vehicle including a light reflector arrangement according to claim 1.

7. The light reflector arrangement of claim 4 wherein the lens has a light diffusing surface opposite the viewing surface such that light output through the lens has a substantially uniform luminance observable from more than one direction.

8. The lamp assembly of claim 6 wherein the lamp assembly is a turn signal lamp housed in an exterior rear view mirror of the vehicle.

9. The light reflector arrangement of claim 7 wherein the light diffusing surface of the lens is formed by applying a surface roughness of greater than 0.4 microns.

10. A lamp assembly for an automotive vehicle, including:
at least one light emitting diode (LED) light source; for each light source, the lamp assembly further including:
a first reflector configured to receive light from the light source;
a second reflector configured to receive reflected light from the first reflector, the second reflector having light scattering means for removing directionality of light reflected from the second reflector, and
a lens configured for receiving light reflected from the second reflector, the lens having a viewing surface and a light diffusing surface opposite the viewing surface;
wherein, light output through the lens has a substantially uniform luminance observable from more than one direction,
wherein the lens is tinted so as to only allow light transmission of between 30-75%, and
wherein the second reflector includes a plurality of concave surfaces, wherein in a cross-section, the concave surfaces each have a single radius forming a plurality of curved troughs, adjacent curved troughs directly contacting one another, and
wherein the lamp assembly is configured to be used for at least one of a vehicle lamp and a vehicle turn signal lamp.

11. The lamp assembly of claim 10 wherein the light scattering means consists of either a rough surface, pillow optics or a wave form comprising a plurality of trough-shaped reflectors.

12. The lamp assembly of claim 10 wherein the tint is black.

13. The lamp assembly of claim 10 wherein the lamp assembly is a turn signal lamp housed in an exterior rear view mirror of the vehicle.

14. A lamp assembly for an automotive vehicle, including:
at least one light emitting diode (LED) light source; for each light source, the lamp assembly further including:
a first reflector configured to receive light from the light source;
a second reflector configured to receive reflected light from the first reflector; the second reflector having a waveform comprising a plurality of trough-shaped reflectors for removing directionality of light reflected from the second reflector; and
a tinted lens allowing light transmission of between 30-75% configured for receiving light reflected from the second reflector, the lens having a viewing surface and a light diffusing surface opposite the viewing surface;
wherein, light output through the lens has a substantially uniform luminance observable from more than one direction,
wherein the second reflector includes a plurality of concave surfaces, wherein in a cross-section, the concave surfaces each have a single radius forming a plurality of curved troughs, adjacent curved troughs directly contacting one another, and
wherein the lamp assembly is configured to be used for at least one of a vehicle lamp and a vehicle turn signal lamp.

15. The lamp assembly of claim 14 wherein the lamp assembly is a turn signal lamp housed in an exterior rear view mirror of the vehicle.

* * * * *